US012611600B2

(12) United States Patent
John et al.

(10) Patent No.: US 12,611,600 B2
(45) Date of Patent: Apr. 28, 2026

(54) THROTTLED GAMING GRAPHICAL USER INTERFACE FOR QUERY REPLY BASED ACCESS DISTRIBUTION

(71) Applicant: Truist Bank, Charlotte, NC (US)

(72) Inventors: Michael Taylor John, San Francisco, CA (US); Noah Jeffrey Joyce, Atlanta, GA (US)

(73) Assignee: TRUIST BANK, Charlotte, NC (US)

( * ) Notice: Subject to any disclaimer, the term of this patent is extended or adjusted under 35 U.S.C. 154(b) by 252 days.

(21) Appl. No.: 18/478,455

(22) Filed: Sep. 29, 2023

(65) Prior Publication Data

US 2025/0108297 A1 Apr. 3, 2025

(51) Int. Cl.
*A63F 13/537* (2014.01)
*A63F 13/35* (2014.01)
(52) U.S. Cl.
CPC ............ *A63F 13/537* (2014.09); *A63F 13/35* (2014.09)
(58) Field of Classification Search
None
See application file for complete search history.

(56) References Cited

U.S. PATENT DOCUMENTS

| | | | | |
|---|---|---|---|---|
| 12,115,453 B2* | 10/2024 | Kim | .................. | A63F 13/56 |
| 2007/0066392 A1* | 3/2007 | Itou | .................. | A63F 13/537 |
| | | | | 463/31 |
| 2012/0309515 A1* | 12/2012 | Chung | .............. | H04N 21/4781 |
| | | | | 463/31 |
| 2013/0190084 A1* | 7/2013 | Lutnick | ................. | G07F 17/32 |
| | | | | 463/31 |
| 2021/0031106 A1* | 2/2021 | Alderman | .............. | A63F 13/35 |

* cited by examiner

*Primary Examiner* — Ronald Laneau
(74) *Attorney, Agent, or Firm* — Michael A. Springs, Esq.; Shumaker, Loop & Kendrick, LLP; Patrick B. Horne

(57) ABSTRACT

A gaming graphical user interface is generated for conducting query and reply trials. A computing system of a first entity is operated to conduct a session of multiple trials, in succession, in each of which the computing system is operated to: select a trial-unique query prompt based at least in part on the player rating by at least one of automatically generating the query prompt and selecting the query prompt; send the trial-unique query prompt to the player device; receive a reply signal from the player device; compare the reply signal to a stored key to confirm only one of affirmation and refutation; upon confirming affirmation, incrementing a token count associated with the user device; toll a trial count; and upon the trial count reaching a predetermined condition, terminating the session of multiple trials.

20 Claims, 9 Drawing Sheets

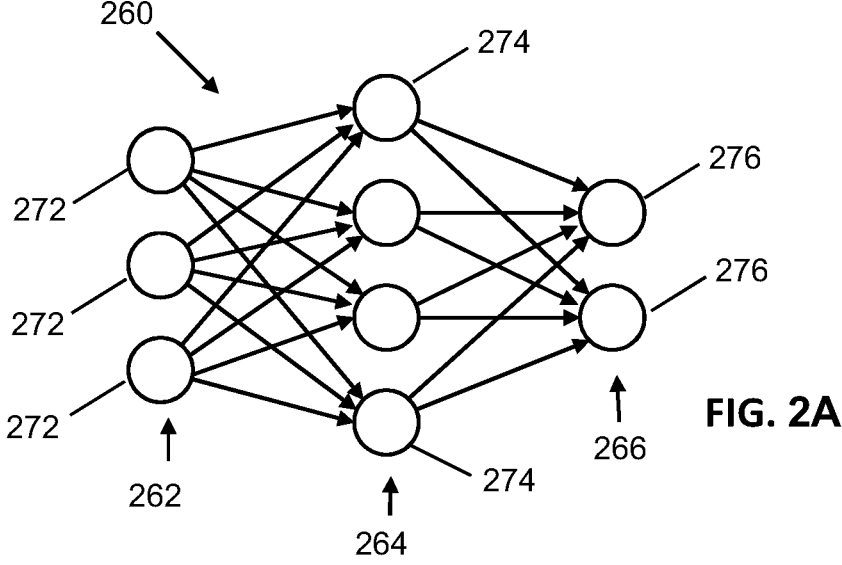
FIG. 2A
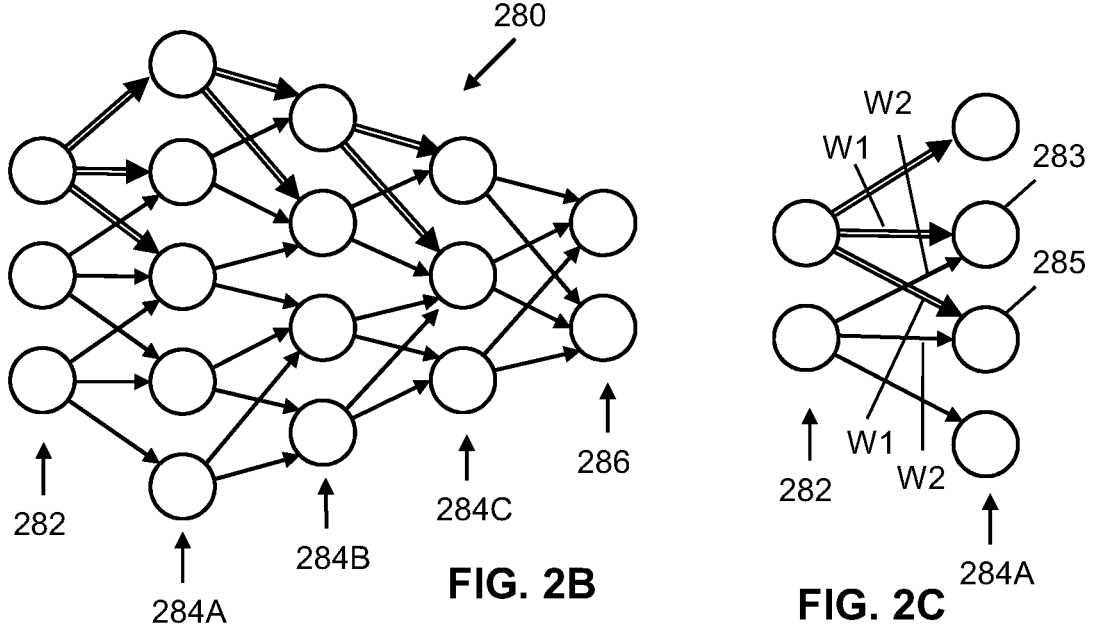
FIG. 2B
FIG. 2C

THROTTLED GAMING GRAPHICAL USER INTERFACE FOR QUERY REPLY BASED ACCESS DISTRIBUTION

FIELD

This invention relates generally to the field of gaming for enjoyment and education, and more particularly to a gaming graphical user interface and conducting query and reply trials, which may be implemented in part by use of artificial intelligence (AI).

BACKGROUND

Many user entities and their service providers are unaware of high-level patterns in their data flows. Conventional paper flow handling of information and resources has been largely replaced by use of computerized data storage and digital transactions. This opens opportunities for informatics previously unavailable, particularly for example through machine learning and artificial intelligence (AI).

Gaming can be used for both enjoyment and education. Merchants and service providers are forever seeking new access and engagement modes for educating and enticing consumers with regard to their products and services.

BRIEF SUMMARY

Embodiments of the present invention address the above needs and/or achieve other advantages by providing apparatuses and methods for conducting query and reply trials.

A system, according to at least one embodiment, for generating a gaming graphical user interface and conducting query and reply trials, includes: a computing system of a first entity including one or more processor configured to execute computer-readable instructions, at least one of a memory device and a non-transitory storage device, and a communication interface for operatively connecting, via a communication network, the one or more processor to a player device to which a player rating is associated. Upon executing the computer-readable instructions, the one or more processor operates the computing system to conduct a session of multiple trials, in succession, in each of which the one or more processor operates the computing system to: automatically select a trial-unique query prompt based at least in part on the player rating; send the trial-unique query prompt to the player device; receive a reply signal from the player device; compare the reply signal to a stored key to confirm only one of affirmation and refutation; and upon confirming affirmation, increment a token count associated with the player device; toll a trial count; and upon the trial count reaching a predetermined condition, terminate the session of multiple trials.

Upon terminating the session of multiple trials, the computing system may prevent any other session of multiple trials for the player device for at least one of a delay interval and a change of date.

The trial count reaching a predetermined condition can be defined by reaching an integer number.

The computing system may store account information for multiple registered users, the account information for each particular registered user including user identification, user contact information by which at least one user device is associated with the particular registered user, and a token count.

In some examples, when the player device matches a user device associated with a particular registered user, the player rating is based on the account information of the particular registered user.

In some examples, when the player device does not match a user device associated with a particular registered user, the player rating is based on at least one of: sending questions to the player device prior to conducting a session of multiple trials and storing replies thereto from the player device; and information from at least one third party source regarding a user with the player device.

The user of the player device may be permitted access to at least one prize based at least in part on the token count associated with the player device.

The trial-unique query prompt of any particular trial may include instructions to display, on a display screen of the player device, a graphical user interface including a particular question and associated multiple selectable answers, wherein one of the selectable answers corresponds to the stored key.

Automatically selecting a trial-unique query prompt for any second or subsequent trial in a session may include selecting at least in part according to whether an affirmation is confirmed for at least one prior reply signal.

Selecting a trial-unique query prompt for any second or subsequent trial in a session may include selecting a query prompt having a raised difficulty rating if an affirmation is confirmed for at least one prior reply signal.

A method, according to at least one embodiment and to which the above examples options apply, is also provided for a computing system to generate a gaming graphical user interface and conduct query and reply trials. The computing system, being of a first entity, includes one or more processor configured to execute computer-readable instructions, at least one of a memory device and a non-transitory storage device, and a communication interface for operatively connecting, via a communication network, the one or more processor to a player device to which a player rating is associated. The method includes, upon executing the computer-readable instructions, the one or more processor operating the computing system to conduct a session of multiple trials, in succession. In each trial, the one or more processor operates the computing system to: automatically select a trial-unique query prompt based at least in part on the player rating; send the trial-unique query prompt to the player device; receive a reply signal from the player device; compare the reply signal to a stored key to confirm only one of affirmation and refutation; upon confirming affirmation, incrementing a token count associated with the player device; toll a trial count; and upon the trial count reaching a predetermined condition, terminating the session of multiple trials.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1A:
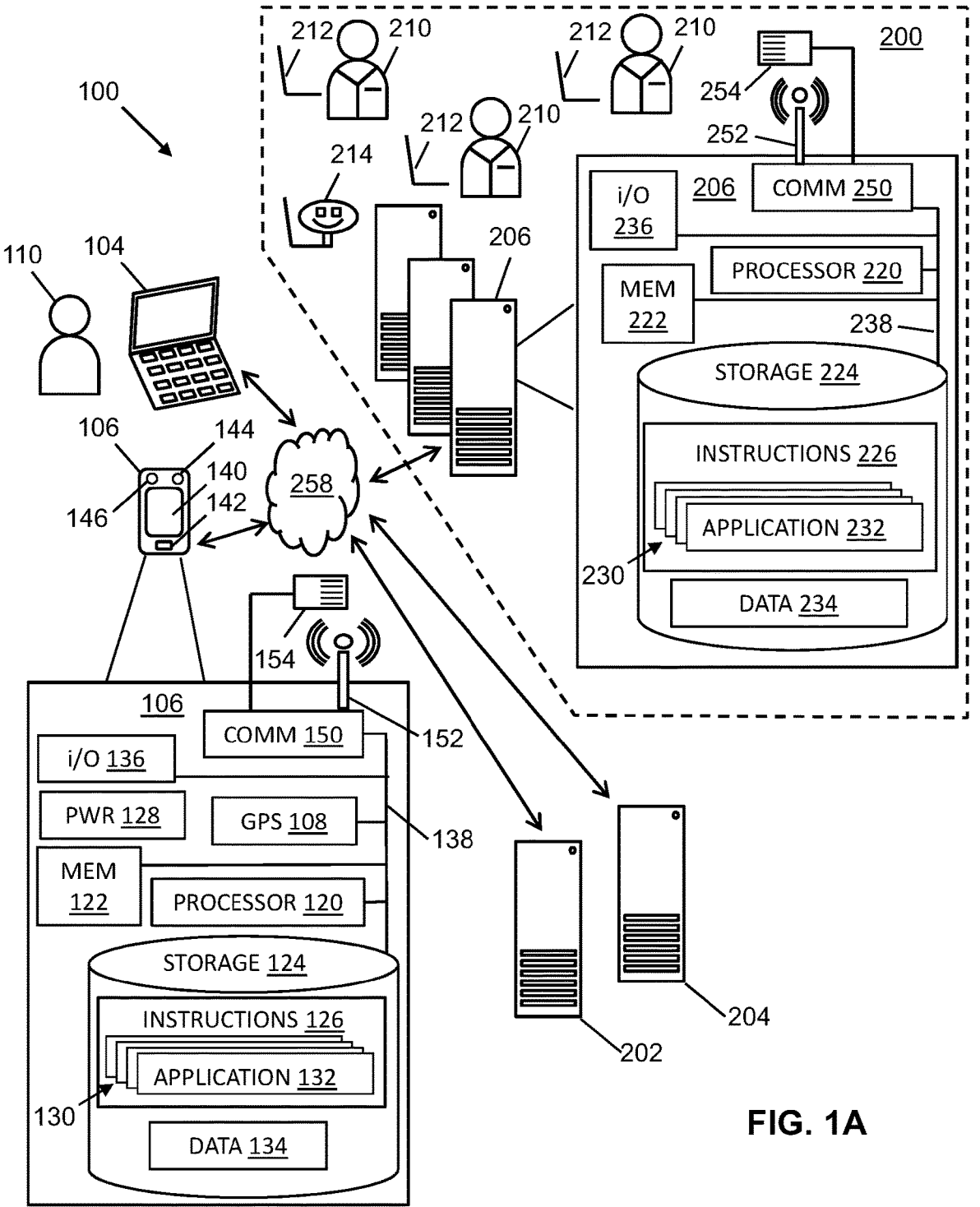

Having thus described embodiments of the invention in general terms, reference will now be made to the accompanying drawings, wherein:

FIG. 1A illustrates an enterprise system, and environment thereof, according to at least one embodiment.

Figure 1B:
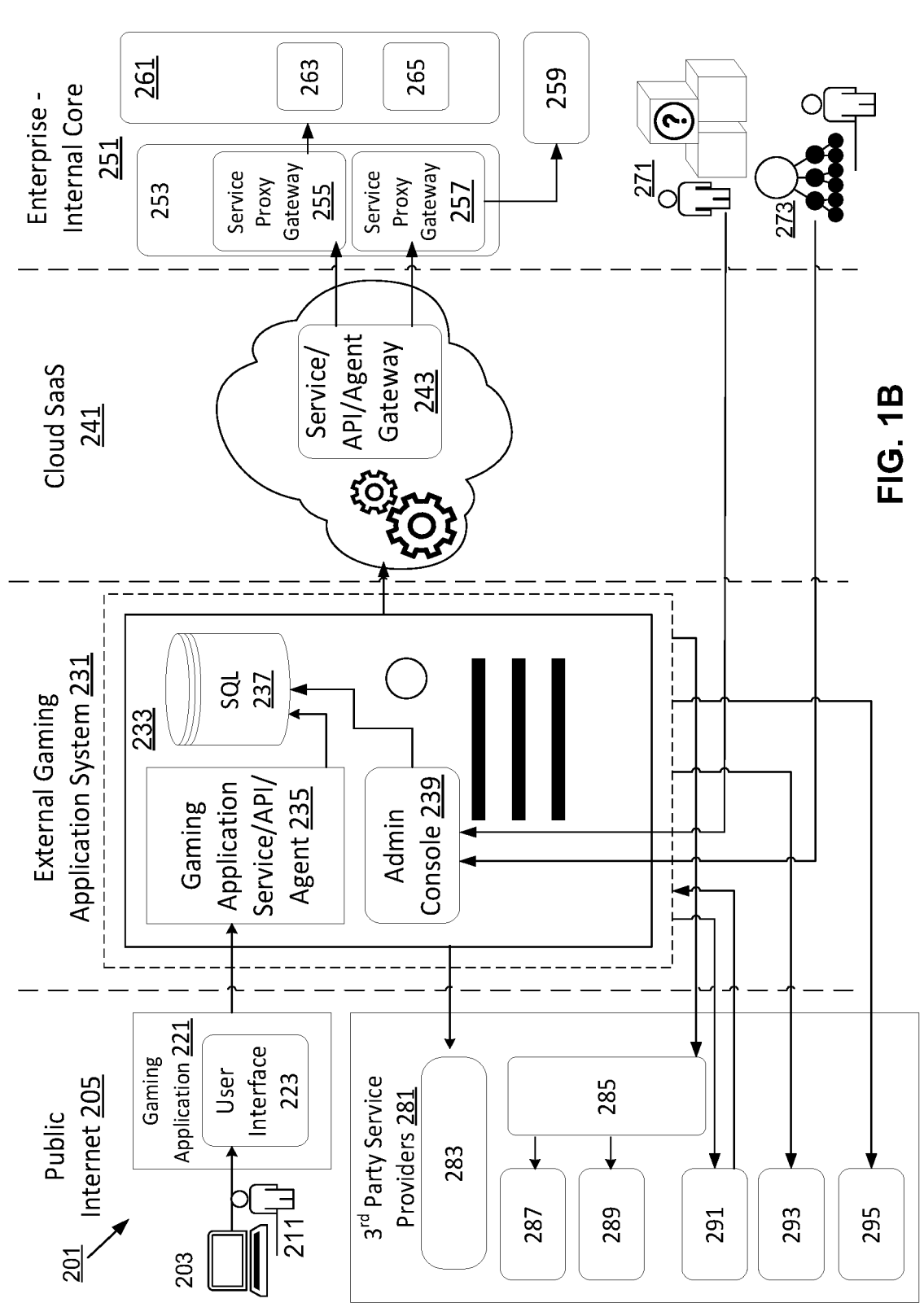

FIG. 1B depicts an example flow diagram for network communication associated with an external gaming application system.

FIG. 2A is a diagram of a feedforward network, according to at least one embodiment, utilized in machine learning FIG. 2B is a diagram of a convolutional neural network (CNN), according to at least one embodiment, utilized in machine learning.

FIG. 2C is a diagram of a portion of the convolutional neural network of FIG. 2B, according to at least one embodiment, illustrating assigned weights at connections or neurons.

Figure 3:
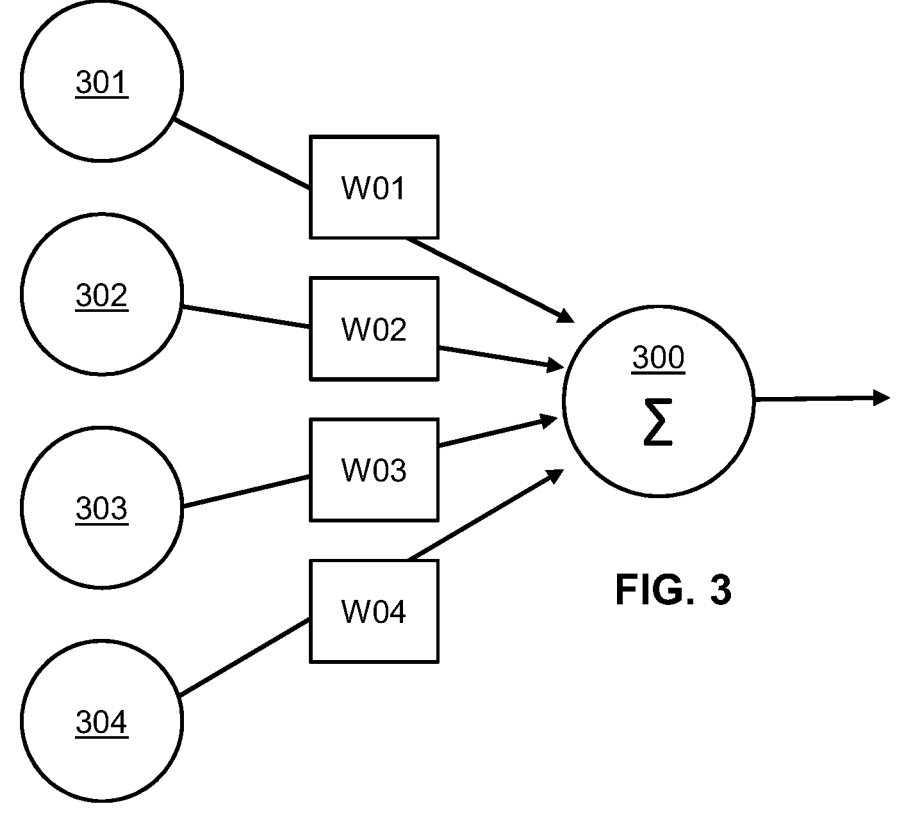

FIG. 3 is a diagram representing an exemplary weighted sum computation in a node in an artificial neural network.

Figure 4:
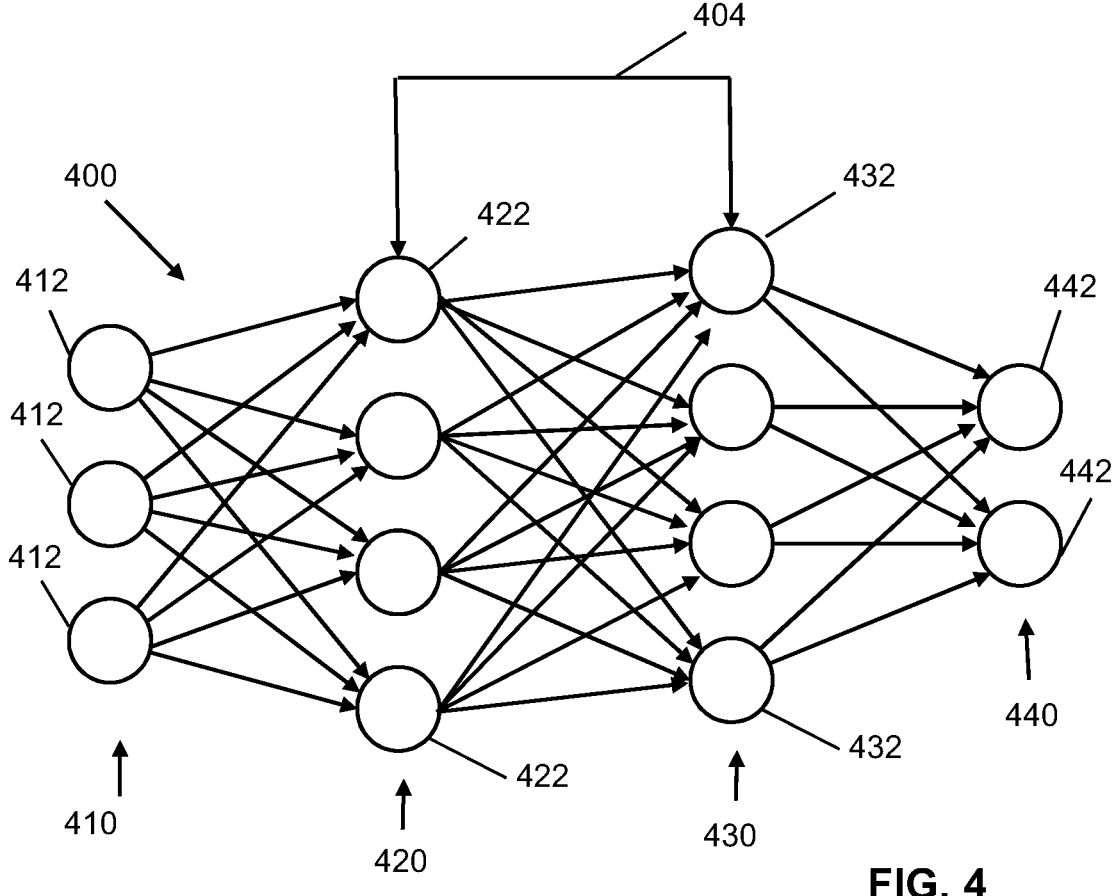

FIG. 4 is a diagram of a Recurrent Neural Network RNN, according to at least one embodiment, utilized in machine learning.

Figure 5:
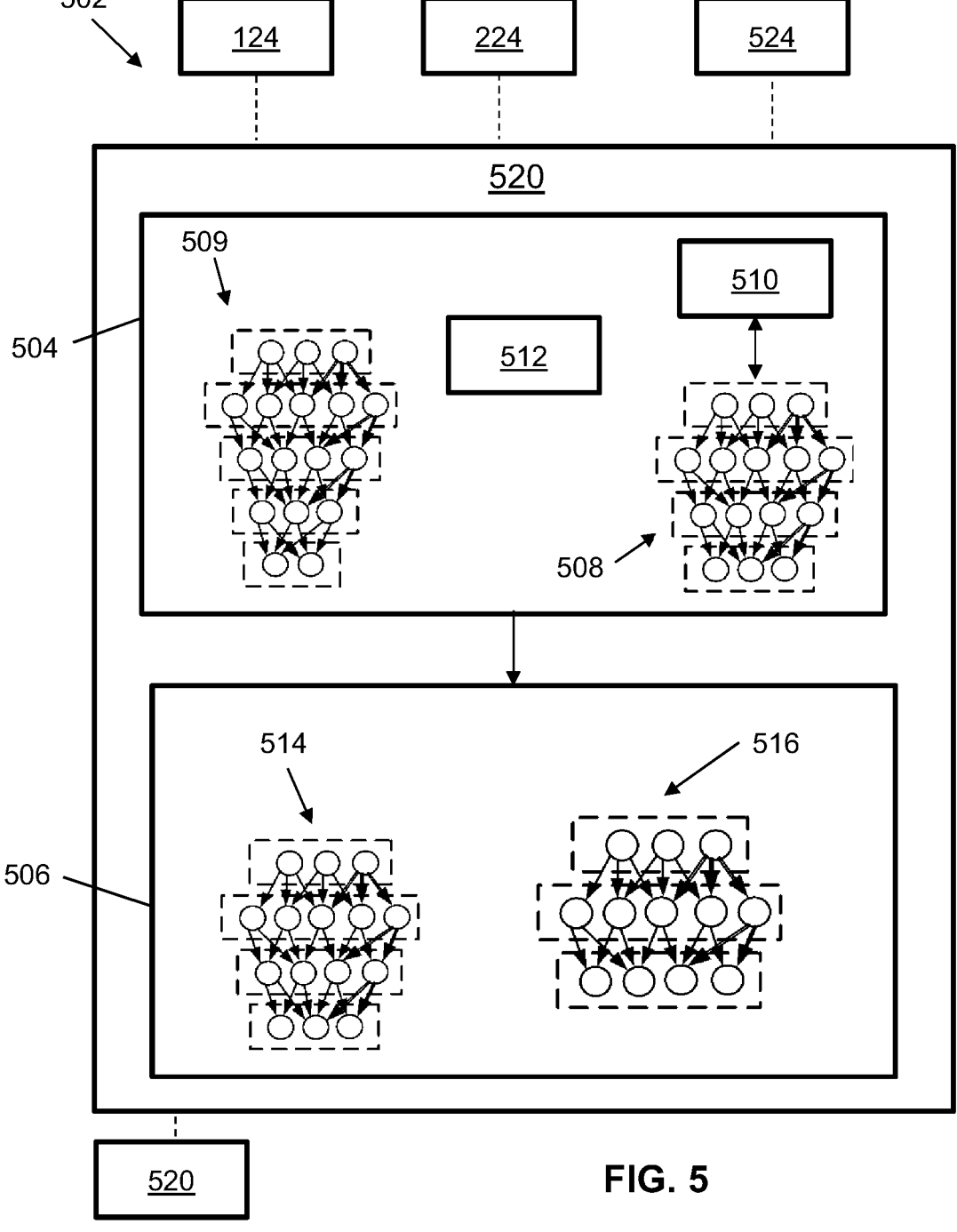

FIG. 5 is a schematic logic diagram of an artificial intelligence program including a front-end and a back-end algorithm.

Figure 6:
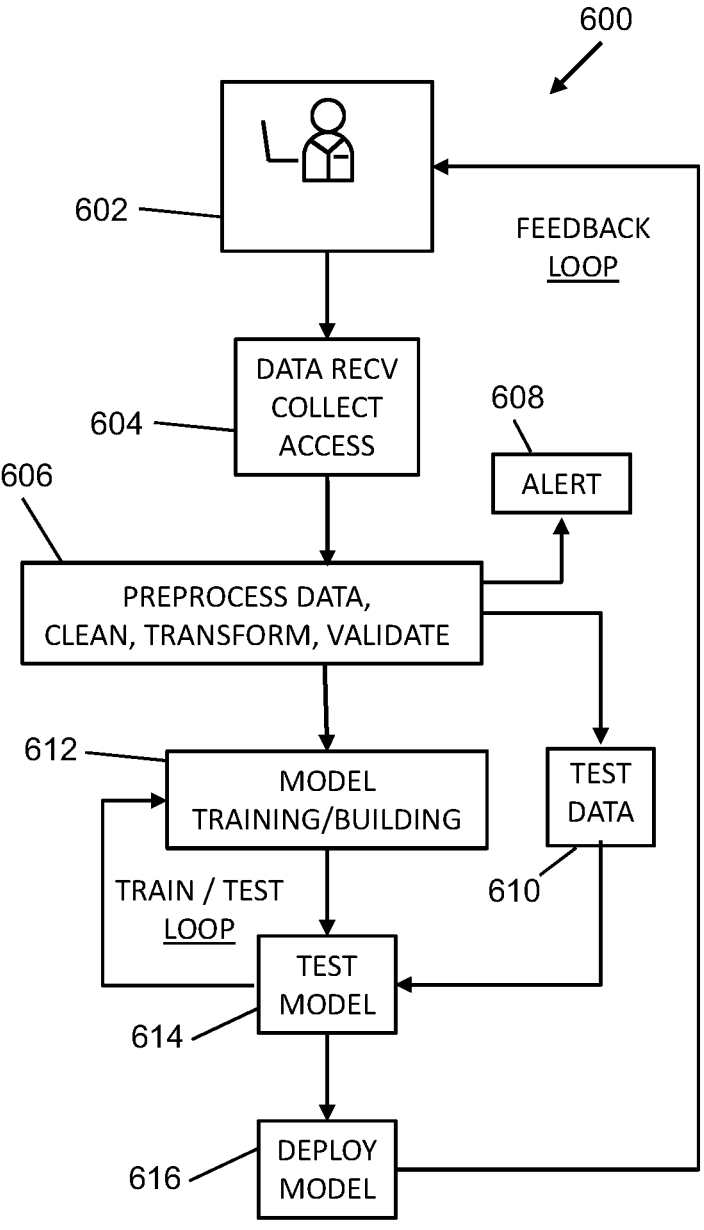

FIG. 6 is a flow chart representing a method, according to at least one embodiment, of model development and deployment by machine learning.

Figure 7:
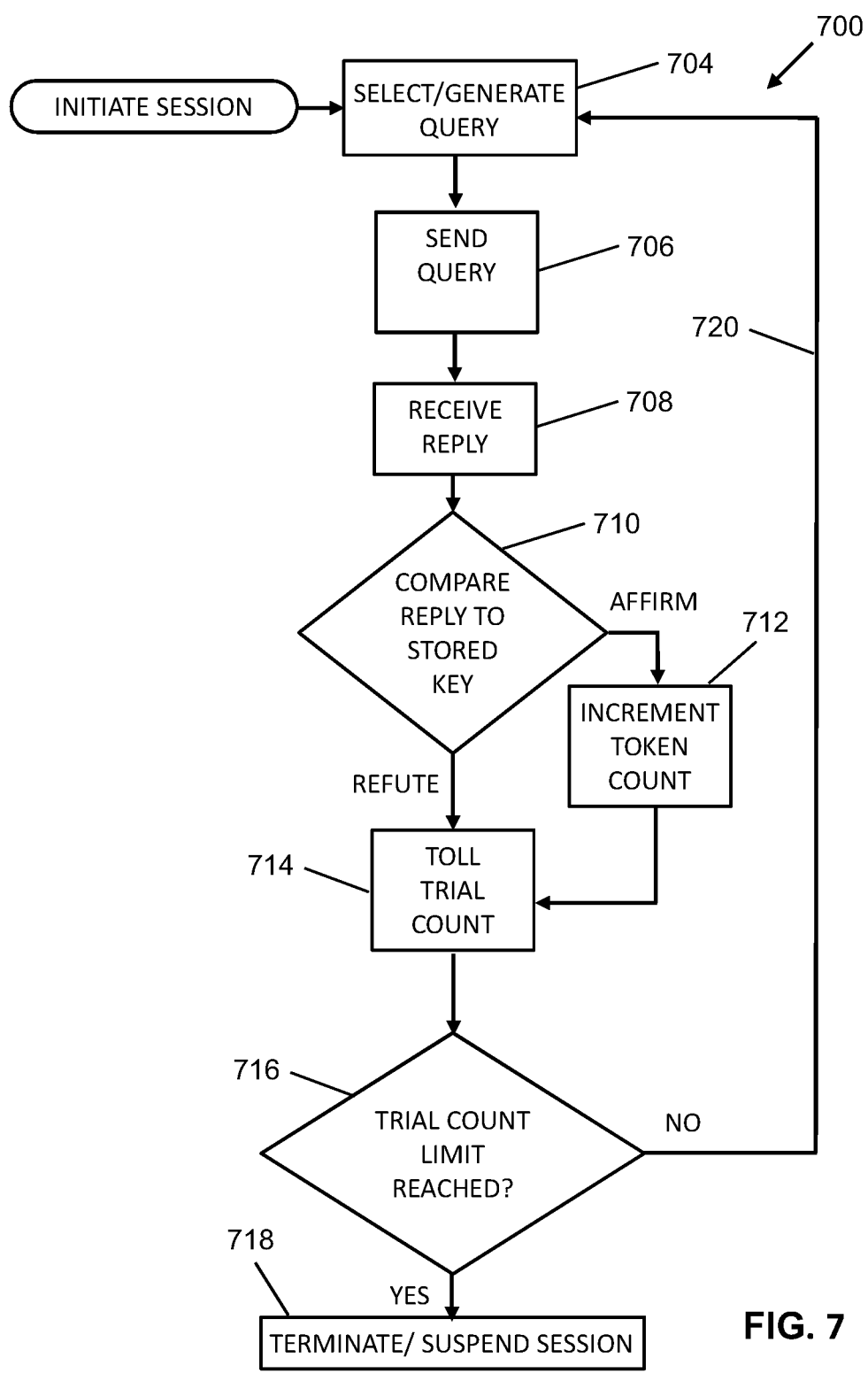

FIG. 7 is flowchart representation of a method for a computing system to generate a gaming graphical user interface and conduct query and reply trials.

Figure 8:
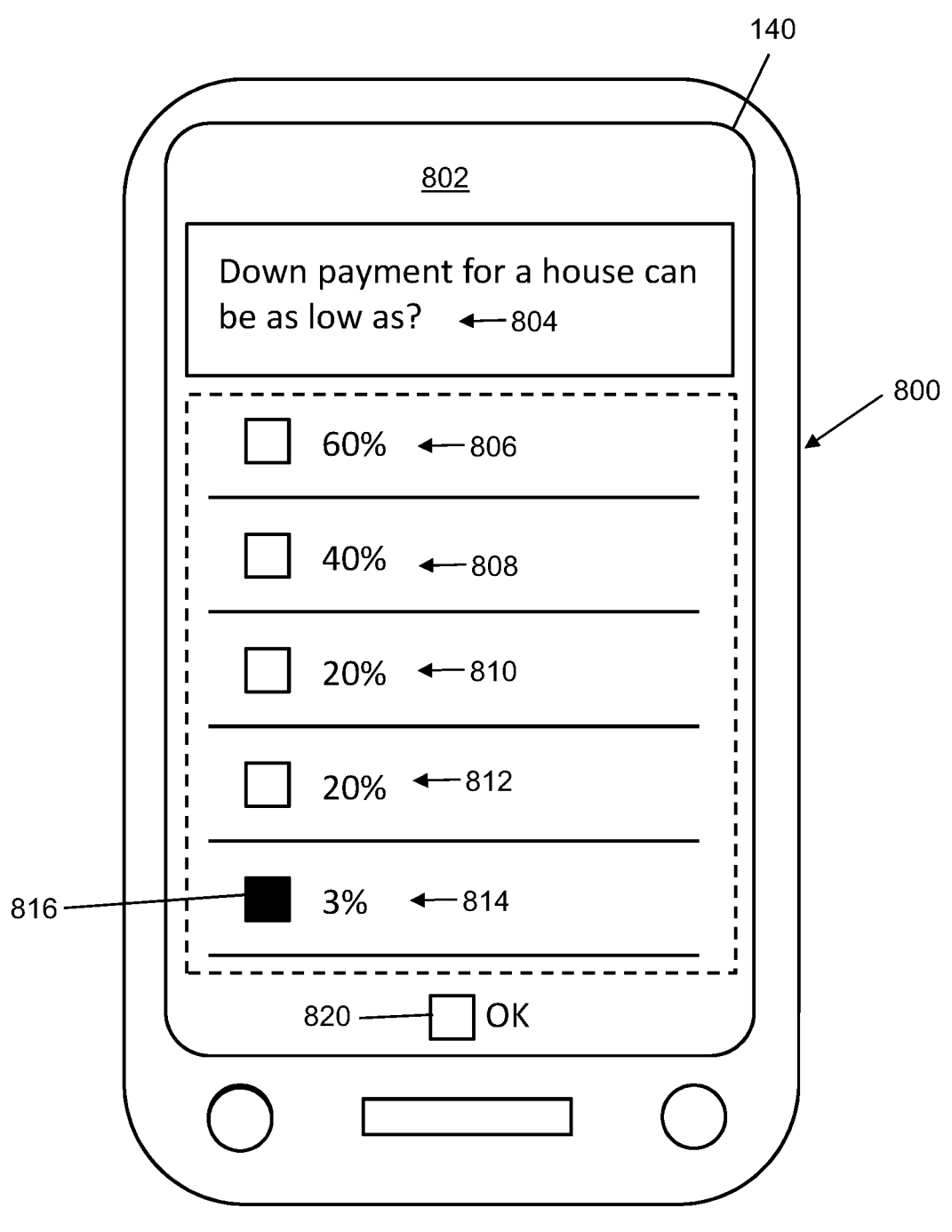

FIG. 8 depicts a player device in user in conjunction with the method of FIG. 7.

DETAILED DESCRIPTION OF EMBODIMENTS
OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to." "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1A illustrates a system 100 and environment thereof, according to at least one embodiment, by which a user 110 benefits through use of services and products of a computing system reference as an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1A as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, IOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120. The user output devices include a display 140 (e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

In some embodiments, a credentialed system enabling authentication of a user may be necessary in order to provide access to the enterprise system 200. In one embodiment, the input and output system 136 may be configured to obtain and process various forms of authentication to authenticate a user 110 prior to providing access to the enterprise system 200. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

The mobile device 106 may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1A applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging. TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, IOS, Android, and any known other operating system used on personal computer, central computing systems, phones, and other devices.

The user devices, referring to either or both of the mobile device 104 and computing device 106, the agent devices 212, and the enterprise computing system 206, which may be one or any number centrally located or distributed, are in communication through one or more networks, referenced as network 258 in FIG. 1A.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1A. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

Two external systems 202 and 204 are expressly illustrated in FIG. 1A, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device 106, the enterprise system 200, and/or the external systems 202 and 204 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

According to one embodiment, a user 110 may initiate an interaction with the enterprise system 200 via the user device 104, 106 and based thereon the enterprise system 200 may transmit, across a network 258, to the user device 104, 106 digital communication(s). In order to initiate the interaction, the user 110 may select, via display 140, a mobile application icon of a computing platform of the enterprise system 200, login via a website to the computing platform of the enterprise system 200, or perform various other actions using the user device 104, 106 to initiate the interaction with the enterprise system 200. In other embodiments, the enterprise system 200 may initiate the interaction with the user 110 via the user device 104, 106. For instance, periodically the enterprise system 200 may transmit unprompted communication(s) such as a short message service (SMS) text message, multimedia message (MMS), or other messages to the user device 104, 106 that includes an embedded link, a web address (e.g., a uniform resource locator (URL)), a scannable code (e.g., a quick response (QR) code, barcode, etc.) to prompt the user 110 to interact with the enterprise system 200.

Once an interaction has been established between the enterprise system 200 and the user device 104, 106, data and/or other information may be exchanged via data transmission or communication in the form of a digital bit stream or a digitized analog signal that is transmitted across the network 258. Based on the user 110 of the user device 104, 106 providing one or more user inputs (e.g., via the user interface, via a speech signal processing system, etc.) data may be received by the enterprise system 200 and data processing is performed thereon using, for example, processing device 220. This received data may then be stored to the storage device 224 or to a third party storage resource such as, for example, external systems 202, 204, which may include a cloud storage service or remote database. Additionally, this collected response data may be aggregated in order to allow the enterprise to have a sampling of responses from multiple users 110. Such aggregated data may be accessible by a relational database management system (e.g., Microsoft SQL server, Oracle Database, MySQL, PostgreSQL, IBM Db2, Microsoft Access, SQLite, MariaDB, Snowflake, Microsoft Azure SQL Database, Apache Hive, Teradata Vantage, etc.) or other software system that enables users to define, create, maintain and control access to information stored by the storage device 224, database, and/or other external systems 202, 204. According to one embodiment, the relational database management system may maintain relational database(s) and may incorporate structured query language (SQL) for querying and updating the database. The relational database(s) may organize data into one or more tables or "relations" of columns (e.g., attributes) and rows (e.g., record), with a unique key identifying each row. According to various embodiments, each table may represent a user/customer profile and the various attributes and/or records may indicate attributes attributed to the user/customer.

For instance, the user/customer profiles may be classified based on various designations/classifiers such as their financial assets, income, bank account types, age, geographic region(s), etc. Each designation/classifier may also include a plurality of sub categories. Storing the collected data to the relational database of the relational database management system may facilitate sorting of the data to filter based on various categories and/or subcategories and/or performing data analytics thereon. According to some embodiments, the enterprise system 200 may utilize algorithms in order to categorize or otherwise classify the data.

The collected data may also have metadata associated therewith that can be accessed by the enterprise system 200. The metadata may include, for example, (i) sequencing data representing the data and time when the response data was created, (ii) modification data indicating the individual (such as user 110) that last modified specific information/data, (iii) weighting data representing the relative importance or magnitude of the attributes, (iv) provider identifier data identifying the owner of the data (e.g., the entity that operates the enterprise system 200), and/or (v) other types of data that could be helpful to the enterprise in order to classify and analyze the collected data.

According to one embodiment, the relational database(s) may store data associated with user/customer profiles in order to sync this data with a gaming functionality and/or application. In particular, the enterprise system 200 may include an enterprise mobile software application that includes a gaming functionality that may be installed on or otherwise accessed by the user device 104, 106. When the user 110 accesses the gaming functionality, the user 110 may be rewarded by performing various tasks. In particular, the user 110 may receive rewards for accomplishing various goals related to financial wellness. The gaming functionality may help the user develop smart financial habits with monetary rewards for developing these habits and is rooted in behavioral economics.

In general, the gaming application disclosed herein may operate via external systems 202, 204 and provides front-end functionalities that enable the user 110 to interact with games. In particular, the external systems 202, 204 may host the game server(s). In one embodiment, the external systems 202, 204 include Amazon Web Services (AWS), which provides a workflow for developing, deploying, and hosting the gaming application. Further, the games may incorporate user/customer profiles that may be linked to that specific user's/customer's profile that is stored within or otherwise associated with the enterprise system 200. By syncing the user/customer profile for the gaming application with the user/customer profile of the enterprise system 200, the gaming application can access information about the user 110 that is derived from the user/customer profile of the enterprise system 200. This enables the gaming application to utilize user/customer data in order to personalize the game in accordance with various enterprise objectives. In a non-limiting example, user/customer data stored by the enterprise system 200 that indicates current account balances may be accessed by the game server(s) of the external system 202, 204 in order to personalize the gaming experience for the user 110 by encouraging certain financial behaviors. Other external system 202, 204 may include promotional prize server(s) that can be configured to generate one or more random numeric outcomes based on one or more rules defining a win likelihood.

To perform various functionalities associated with the gaming application, the game server(s) may be configured to make an API call to the prize server(s) to provide information necessary to generate a random numeric outcome. For instance, the API call may indicate a current game at a current level, and the prize server(s) process the information provided to generate a random number based on that information in accordance with various rules defining a win likelihood. The prize server(s) then provide results from the random number generator, which is used to determine a monetary reward in response to the actions performed by the user 110. In addition, the monetary rewards obtained as a result of performing various actions via the gaming application may be transferred to user/customer accounts identified by the user/customer profile of the enterprise.

FIG. 1B depicts an example flow diagram 201 for network communication associated with an external gaming application system 231, in accordance with an embodiment of the present invention. In particular, the flow diagram 201 depicts a user 211 providing one or more inputs, via a user device 203, to access the gaming application 221 across a public network 205 (e.g., public internet). The gaming application 221 includes a user interface 223 through which the user 211 interacts in order to play electronic game(s) (i.e., video game(s)). The game(s) may be played when the user 211 interacts via the user interface 223 and/or through other input device(s) (e.g., a joystick, controller, keyboard, motion sensing device, etc.). Inputs provided by the user 211 may generate visual feedback through a display of the user device 203.

The gaming application 221 is configured to communicate with an external gaming application system 231 that include server(s) 233 that are used to host the gaming application 221. Example cloud-based sever(s) 233 include, for example, AWS. The cloud-based server(s) 233 that host the gaming application 221 include the gaming application service/API/agent 235 that receives an API call from the gaming application 221. The API call utilizes a uniform resource identifier (URI), such as a URL, that identifies the cloud-based server(s) 233, incorporates the application layer protocol (e.g., the HTTP method) indicating the desired action to be performed by the service/API/agent 235 (e.g., the data to be extracted, the functionality to be performed, etc.), includes a header so that the service/API/agent 235 understands the request, and includes an API key or access token used by the service/API/agent 235 to authenticate the API call. The service/API/agent 235 accesses data from the relational database 237 (e.g., SQL database), which may include a collection of structured data needed for the gaming application 221 to integrate various features. The admin console 239 is used by support and developers to provide administrative functions (e.g., provide support for customers, check on the health of the external gaming application system, etc.).

The external gaming application system is integrated with a cloud SaaS 241, which is configured to receive API calls from the cloud-based server(s) 233 to access user data associated with a user profile of the user 211. In a non-limiting example, the user data includes information associated with financial services and products offered by the enterprise such as direct deposit information, current financial balance information, financial savings information, financial transaction history, etc.). The cloud SaaS 241 includes a service/API/agent gateway 243, which acts an edge gateway or network entry point for the enterprise-internal core system 251. The service/API/agent gateway 243 may provide, according to one embodiment, network translation between networks that use different protocols and may include routers, routing switches, multiplexers, etc. In one particular embodiment, the service/API/agent gateway 243 includes various permissions to perform calls to fetch the user data.

Retrieval of user data within the enterprise-internal core system 251 is facilitated by use of service proxy gateway(s) 255, 257 of the gateway platform 253. The gateway platform 253 is a multichannel API gateway configured to provide security, control, integration and optimized access to fetch user data. The service proxy gateway(s) 255, 257 are modules that receive the API requests and forward them to defined endpoints within the internal enterprise system 261. In particular, the service proxy gateway(s) 255, 257 facilitate load balancing, access filtering, caching, etc. The internal enterprise system 261 includes an API-powered business ecosystem that enables the enterprise to perform various backend services and business functionalities. The internal enterprise system 261 includes service/API/agent systems 263, 265 that can be used to access the user data from original data sources and used to facilitate payments from a holding account of the cloud-based server(s) 233 so that the financial payments can be transferred to deposit account(s) associated with the user profile of the user 211. According to various embodiments, the financial payments may be made according to a predefined schedule and/or in response to a request from the user 211. The enterprise-internal core system 251 also includes a digital identity and authentication system 259 that is used to authenticate the user 211 and link the user's gaming profile/account to their user profile associated with the enterprise. The enterprise-internal core system 251 is also used by support agents 271 to provide customer support, resolve customer inquiries, etc. Further, the enterprise-internal core system 251 is used by administrators 273 to provide administrative functions for the external gaming application system 231.

Various third-party service providers 281 are also integrated with the external gaming application system 231. One example third-party service provider includes a game operator system 283 that includes promotional prize server(s) that can be configured to generate one or more random numeric outcomes based on one or more rules defining a win likelihood. A communication provider 285 may provide digital communications such as electronic messages through a communications platform 287 and push notifications through an operating system 289. A marketing analysis platform 291 may be used to analyze the efficacy of various messaging and communications associated with the gaming application system 231 and can provide feedback that can be used by the gaming application system 231 to modify functionalities to align with enterprise objectives. For example, the marketing analysis platform 291 may be used for inbound marketing channel attribution and outbound marketing channel attribution so that the enterprise may determine how marketing tactics influence customer interactions. A monitoring system provider 293 may provide off-duty support to detect problems with the gaming application system 231 by using real-time monitoring. When a problem is detected, the monitoring system provider 293 distributes an alert so that the problem can be resolved. An analytics provider 295 may analyze ways in which users interact with the gaming application system 231 in order to perform user experience analysis. Various additional or alternative third-party service providers 281 may also be utilized according to various embodiments.

In other embodiments, the external gaming application 231 is not external to the enterprise internal core 251. Rather, a gaming application may be integrated within the enterprise internal core 251, which advantageously eliminates use of the cloud SaaS 241. In particular, cloud-based server(s) 233 that host the gaming application 221, such as those provided via AWS would still host the gaming application 221, but the application system would be integrated within the enterprise internal core 251. The processes and systems described herein are not limited to the example flow diagram 201, and various other network flow communications may alternatively be implemented that would facilitate access to the gaming application 221.

In one or more embodiment, a system and a corresponding method are implemented for generating a gaming graphical user interface and conducting query and reply trials. In concise terms, a trivia game can be implemented in which a player is engaged via a player device in exchanges of questions and answers. The subject matters perused by the trivia game can be educational toward, for example, products and services offered by an enterprise entity. Tokens representing earned rewards, access thereto, or access to upcoming chances to win, are won by the player providing correct answers questions. Gaming sessions may be offered periodically, and in a limited way. For example, a player may be permitted a limited number of question in any given time period. In at least one example, one session of only up to three questions is permitted a player in any given consecutive twenty four hours or in any given calendar day. In some examples, further trials beyond some threshold may not be purchased, thereby preventing over use and limiting overlap of possible other pay-to-play or paid access games, products and services.

In any given session of multiple trials or questions, questions posed subsequent to replies may increase or decrease in difficulty or sophistication according to whether prior answers, in that session or another, were correct or incorrect. For example, questions in a cache may have each a respective difficulty rating according to accumulated data among multiple users having previously gamed and replied.

The game-offering entity, or first entity, can in various implementation be described as an enterprise entity, a business entity, a retailer, a merchant entity, a financial institution, a bank, or other service and/or product provider. As such, the first entity may maintain or have access to, user profiles and accounts. Questions for any given user in any given session can be tailored to their situation, according to user information maintained in or in association with such user profiles and accounts.

In at least the immediately below descriptions, reference numbers are provided correlating terms to examples of elements in various ones of the drawings (FIGS), without limitation of those terms to such correlations. Implemented as a system 200, a computing system 206 of a first entity includes one or more processor 220 configured to execute computer-readable instructions 226, at least one of a memory device 222 and a non-transitory storage device 224, and a communication interface 236 for operatively connecting, via a communication network 258, the one or more processor to a player device (104, 106) to which a player rating is associated. Upon executing the computer-readable instructions, the one or more processor operates the computing system to conduct a session of multiple trials, in succession, in each of which the one or more processor operates the computing system to automatically take prescribed steps of action as referenced together as a method 700 in FIG. 7, and as implemented in at least one embodiment via in part a user's portable device, referenced as a player device 800 in FIG. 8, to which the above description of the user computing device 104 and the user mobile device 106 apply. These described session include conducting query and reply trials, and may at least in part be implement by use of an artificial intelligence (AI) algorithm.

Before proceeding with further description of the inventive gaming graphical user interface by which such query and reply trials are conducted, these description turn now to FIG. 2A through FIG. 6. As used herein, an artificial intelligence system, artificial intelligence algorithm, artificial intelligence module, program, and the like, generally refer to computer implemented programs that are suitable to simulate intelligent behavior (i.e., intelligent human behavior) and/or computer systems and associated programs suitable to perform tasks that typically require a human to perform, such as tasks requiring visual perception, speech recognition, decision-making, translation, and the like. An artificial intelligence system may include, for example, at least one of a series of associated if-then logic statements, a statistical model suitable to map raw sensory data into symbolic categories and the like, or a machine learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms, and modules are used at least in part in implementing artificial intelligence (AI) functions, systems, and methods.

Artificial Intelligence and/or machine learning programs may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine learning program may be configured to implement stored processing, such as decision tree learning, association rule learning, artificial neural networks, recurrent artificial neural networks, long short term memory networks, inductive logic programming, support vector machines, clustering. Bayesian networks, reinforcement learning, representation learning, similarity and metric learning, sparse dictionary learning, genetic algorithms, k-nearest neighbor (KNN), and the like. In some embodiments, the machine learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine learning module may include a machine learning acceleration logic, e.g., a fixed function matrix multiplication logic, in order to implement the stored processes and/or optimize the machine learning logic training and interface.

One type of algorithm suitable for use in machine learning modules as described herein is an artificial neural network or neural network, taking inspiration from biological neural networks. An artificial neural network can, in a sense, learn to perform tasks by processing examples, without being programmed with any task-specific rules. A neural network generally includes connected units, neurons, or nodes (e.g., connected by synapses) and may allow for the machine learning program to improve performance. A neural network may define a network of functions, which have a graphical relationship. As an example, a feedforward network may be utilized, e.g., an acyclic graph with nodes arranged in layers.

A feedforward network (see, e.g., feedforward network 260 referenced in FIG. 2A) may include a topography with a hidden layer 264 between an input layer 262 and an output layer 266. The input layer 262, having nodes commonly referenced in FIG. 2A as input nodes 272 for convenience, communicates input data, variables, matrices, or the like to the hidden layer 264, having nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge. In at least one embodiment of such a feedforward network, data is communicated to the nodes 272 of the input layer, which then communicates the data to the hidden layer 264. The hidden layer 264 may be configured to determine the state of the nodes in the respective layers and assign weight coefficients or parameters of the nodes based on the edges separating each of the layers, e.g., an activation function implemented between the input data communicated from the input layer 262 and the output data communicated to the nodes 276 of the output layer 266. It should be appreciated that the form of the output from the neural network may generally depend on the type of model represented by the algorithm. Although the feedforward network 260 of FIG. 2A expressly includes a single hidden layer 264, other embodiments of feedforward networks within the scope of the descriptions can include any number of hidden layers. The hidden layers are intermediate the input and output layers and are generally where all or most of the computation is done.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem. Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between $-1$ and 1) may be used to modify the previous coefficient, e.g., a propagated value. The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An additional or alternative type of neural network suitable for use in the machine learning program and/or module is a Convolutional Neural Network (CNN). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

An exemplary convolutional neural network CNN is depicted and referenced as 280 in FIG. 2B. As in the basic feedforward network 260 of FIG. 2A, the illustrated example of FIG. 2B has an input layer 282 and an output layer 286. However where a single hidden layer 264 is represented in FIG. 2A, multiple consecutive hidden layers 284A, 284B, and 284C are represented in FIG. 2B. The edge neurons represented by white-filled arrows highlight that hidden layer nodes can be connected locally, such that not all nodes of succeeding layers are connected by neurons. FIG. 2C, representing a portion of the convolutional neural network 280 of FIG. 2B, specifically portions of the input layer 282 and the first hidden layer 284A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301, 302, 303 and 304 are each assigned a respective weight W01, W02, W03, and W04 in the computation at the node 300, which in this example is a weighted sum.

An additional or alternative type of feedforward neural network suitable for use in the machine learning program and/or module is a Recurrent Neural Network (RNN). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter, e.g., at least a portion of the output data from the RNN may be used as feedback/input in calculating subsequent output data. In some embodiments, the machine learning module may include an RNN configured for language processing, e.g., an RNN configured to perform statistical language modeling to predict the next word in a string based on the previous words. The RNN(s) of the machine learning program may include a feedback system suitable to provide the connection(s) between subsequent and previous layers of the network.

An example for a Recurrent Neural Network RNN is referenced as 400 in FIG. 4. As in the basic feedforward network 260 of FIG. 2A, the illustrated example of FIG. 4 has an input layer 410 (with nodes 412) and an output layer 440 (with nodes 442). However, where a single hidden layer 264 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more and up to all of the nodes of a subsequent layer may provide or communicate a parameter or other data to a previous layer of the RNN network 400. Moreover and in some embodiments, the RNN 400 may include multiple feedback connectors 404 (e.g., connectors 404 suitable to communicatively couple pairs of nodes and/or connector systems 404 configured to provide communication between three or more nodes). Additionally or alternatively, the feedback connector 404 may communicatively couple two or more nodes having at least one hidden layer between them, i.e., nodes of nonsequential layers of the RNN 400.

In an additional or alternative embodiment, the machine learning program may include one or more support vector machines. A support vector machine may be configured to determine a category to which input data belongs. For example, the machine learning program may be configured to define a margin using a combination of two or more of the input variables and/or data points as support vectors to maximize the determined margin. Such a margin may generally correspond to a distance between the closest vectors that are classified differently. The machine learning program may be configured to utilize a plurality of support vector machines to perform a single classification. For example, the machine learning program may determine the category to which input data belongs using a first support vector determined from first and second data points/variables, and the machine learning program may independently categorize the input data using a second support vector determined from third and fourth data points/variables. The support vector machine(s) may be trained similarly to the training of neural networks, e.g., by providing a known input vector (including values for the input variables) and a known output classification. The support vector machine is trained by selecting the support vectors and/or a portion of the input vectors that maximize the determined margin.

As depicted, and in some embodiments, the machine learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers). Generally, the neural network(s) of the machine learning program may include a relatively large number of layers, e.g., three or more layers, and are referred to as deep neural networks. For example, the node of each hidden layer of a neural network may be associated with an activation function utilized by the machine learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

According to various implementations, deep neural networks incorporate neurons, synapses, weights, biases, and functions and can be trained to model complex non-linear relationships. Various deep learning frameworks may include, for example, TensorFlow, MxNet, PyTorch, Keras, Gluon, and the like. Training a deep neural network may include complex input/output transformations and may include, according to various embodiments, a backpropagation algorithm. According to various embodiments, deep neural networks may be configured to classify images of handwritten digits from a dataset or various other images. According to various embodiments, the datasets may include a collection of files that are unstructured and lack predefined data model schema or organization. Unlike structured data, which is usually stored in a relational database (RDBMS) and can be mapped into designated fields, unstructured data comes in many formats that can be challenging to process and analyze. Examples of unstructured data may include, according to non-limiting examples, dates, numbers, facts, emails, text files, scientific data, satellite imagery, media files, social media data, text messages, mobile communication data, and the like.

Referring now to FIG. 5 and some embodiments, an AI program 502 may include a front-end algorithm 504 and a back-end algorithm 506. The artificial intelligence program 502 may be implemented on an AI processor 520, such as the processing device 120, the processing device 220, and/or a dedicated processing device. The instructions associated with the front-end algorithm 504 and the back-end algorithm 506 may be stored in an associated memory device and/or storage device of the system (e.g., memory device 124 and/or memory device 224) communicatively coupled to the AI processor 520, as shown. Additionally or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end network 504 configured to perform pre-processing, such as feature recognition, and a back-end network 506 configured to perform an operation on the data set communicated directly or indirectly to the back-end network 506). For instance, the front-end program 506 can include at least one CNN 508 communicatively coupled to send output data to the back-end network 506.

Additionally or alternatively, the front-end program 504 can include one or more AI algorithms 510, 512 (e.g., statistical models or machine learning programs such as decision tree learning, associate rule learning, recurrent artificial neural networks, support vector machines, and the like). In various embodiments, the front-end program 504 may be configured to include built in training and inference logic or suitable software to train the neural network prior to use (e.g., machine learning logic including, but not limited to, image recognition, mapping and localization, autonomous navigation, speech synthesis, document imaging, or language translation). For example, a CNN 508 and/or AI algorithm 510 may be used for image recognition, input categorization, and/or support vector training. In some embodiments and within the front-end program 504, an output from an AI algorithm 510 may be communicated to a CNN 508 or 509, which processes the data before communicating an output from the CNN 508, 509 and/or the front-end program 504 to the back-end program 506. In various embodiments, the back-end network 506 may be configured to implement input and/or model classification, speech recognition, translation, and the like. For instance, the back-end network 506 may include one or more CNNs (e.g., CNN 514) or dense networks (e.g., dense networks 516), as described herein.

For instance and in some embodiments of the AI program 502, the program may be configured to perform unsupervised learning, in which the machine learning program performs the training process using unlabeled data, e.g., without known output data with which to compare. During such unsupervised learning, the neural network may be configured to generate groupings of the input data and/or determine how individual input data points are related to the complete input data set (e.g., via the front-end program 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known, e.g., a mix of labeled and unlabeled data having the same distribution.

In some embodiments, the AI program 502 may be accelerated via a machine learning framework 520 (e.g., hardware). The machine learning framework may include an index of basic operations, subroutines, and the like (primitives) typically implemented by AI and/or machine learning algorithms. Thus, the AI program 502 may be configured to utilize the primitives of the framework 520 to perform some or all of the calculations required by the AI program 502. Primitives suitable for inclusion in the machine learning framework 520 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine learning program may include variations, adaptations, and alternatives suitable to perform the operations necessary for the system, and the present disclosure is equally applicable to such suitably configured machine learning and/or artificial intelligence programs, modules, etc. For instance, the machine learning program may include one or more long short-term memory (LSTM) RNNs, convolutional deep belief networks, deep belief networks DBNs, and the like. DBNs, for instance, may be utilized to pre-train the weighted characteristics and/or parameters using an unsupervised learning process. Further, the machine learning module may include one or more other machine learning tools (e.g., Logistic Regression (LR), Naive-Bayes, Random Forest (RF), matrix factorization, and support vector machines) in addition to, or as an alternative to, one or more neural networks, as described herein.

FIG. 6 is a flow chart representing a method 600, according to at least one embodiment, of model development and deployment by machine learning. The method 600 represents at least one example of a machine learning workflow in which steps are implemented in a machine learning project.

In step 602, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, step 602 can represent a starting point. However, with regard to continuing or improving an ongoing machine learning workflow, step 602 can represent an opportunity for further user input or oversight via a feedback loop.

In step 604, data is received, collected, accessed, or otherwise acquired and entered as can be termed data ingestion. In step 606 the data ingested in step 604 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing step 606 is updated with newly ingested data, an updated model will be generated. Step 606 can include data validation, which focuses on confirming that the statistics of the ingested data are as expected, such as that data values are within expected numerical ranges, that data sets are within any expected or required categories, and that data comply with any needed distributions such as within those categories. Step 606 can proceed to step 608 to automatically alert the initiating user, other human or virtual agents, and/or other systems, if any anomalies are detected in the data, thereby pausing or terminating the process flow until corrective action is taken.

In step 610, training test data such as a target variable value is inserted into an iterative training and testing loop. In step 612, model training, a core step of the machine learning work flow, is implemented. A model architecture is trained in the iterative training and testing loop. For example, features in the training test data are used to train the model based on weights and iterative calculations in which the target variable may be incorrectly predicted in an early iteration as determined by comparison in step 614, where the model is tested. Subsequent iterations of the model training, in step 612, may be conducted with updated weights in the calculations.

When compliance and/or success in the model testing in step 614 is achieved, process flow proceeds to step 616, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

In various system and methods according to embodiments expressly described herein and those inferred therefrom, these descriptions return to the prescribed steps of action referenced together as method 700 in FIG. 7, and as implemented in at least one embodiment in cooperation with or through use of a user's portable device 800 as represented in FIG. 8. Multiple trials are conducted in succession. In the one or more processor operates the computing system to automatically take prescribed steps of action as referenced together as a method 700 in FIG. 7. When a session is initiated, the method 700 proceeds to step 704 to select a trial-unique query prompt based at least in part on the player rating. Trial-unique refers to a single session, such that query prompts among trials in a single session are unique to each other, such that the play is presented a different question with each successive trial in a session. A query can be selected automatically by proceeding along a pre-existing list in order. A player rating, relating for example to past performance by the player, can be used in the selection process in real time to skip related questions, or to fill in or explore a player's knowledge insufficiencies. A query prompt can include an associated question, or an identification of an associate question for example already stored or recently sent/downloaded on the player device, for example upon initiation of the session.

The method 700 proceeds to step 706, to send the trial-unique query prompt to the player device. A query prompt can include an associated question, or an identification of an associated question for example already stored or recently sent/downloaded on the player device, for example upon initiation of the session. In either case, in some examples, the trial-unique query prompt of any particular trial includes instructions to display, on a display screen 140 of the player device 800, a graphical user interface 802 comprising a particular question 804 and associated multiple selectable answers (806-814), at least one of which corresponds to a stored key, which represents a correct answer. In the illustrated example, in which the trial is presented a question with multiple choice answers, each answer has a corresponding respective check box or other virtual selection action tool for selection by user input. For example, in FIG. 8, the user has selected answer 814 by actuation of the associated virtual selection action tool 816.

In some embodiments, such selection of a single answer prompts the sending of a reply signal by the player. In other embodiments, for example when a query prompt associated question has more than one correct answer, or when multiple selections indicate a player's response or preference, a submit action tool 820 can be provided by the graphical user interface 802, the use of which prompts the sending of a reply signal by the player. As described with reference to the user device 106 and 104, which descriptions apply as well to the player device 800, the communication interface 150 (FIG. 1A) facilitates communication and sending a reply signal, conveying the selection and/or answer pattern of the player, to the sender of the query prompt.

The method 700 proceeds to step 708, to receive the reply signal from the player device. The method 700 proceeds to step 710, to compare the reply signal to a stored key to confirm only one of affirmation and refutation. The comparison can be conducted first-entity side, with reference for example to system 200 and the computing system 206, or client-side, with reference to the player device 800. For a first-entity side determination, the stored key is maintained, with reference for example to the memory device 222 and non-transitory storage device 224 (FIG. 1A), without the stored key being sent to the player device, for example for heightened gaming security. In examples where the determination of affirmation or refutation is made at the player device, the stored key can be sent thereto with the query prompt. In either case, affirmation represents a correct answer to a question according the associated stored key, and refutation similarly represents an incorrect answer.

Upon confirming affirmation, the method proceeds to step 712, to increment a token count associated with the player device, and then to step 714. In one example, a token count is an integer count, increasing with each increment, and representing an accumulating prize resource of the player associated with the player device. In some examples, the user of the player device is permitted to access a prize base at least in part on the token count. The token count can represent the count virtual coins available to the user, and in some examples can be traded or transacted for products, services, and/or access to contests such as sweepstakes, lotteries, and funds.

Upon confirming refutation, the method 700 proceeds to step 714, bypassing step 712 without incrementing a token count. This represents that an incorrect answer was selected or otherwise entered, for which no particular reward is necessarily granted. However, in some examples, players are incentivized to play by receiving a token or other benefit even when all or some answers are incorrect.

Whether affirmation and refutation is confirmed, the method proceeds to step 714, to toll a trial count. The trial count is tolled in the illustrated embodiment of the method 700 in order to limit gaming sessions with regard to any given player and player device. For example, a player may be permitted a limited number of questions in any given session or time period. In at least one example, one session of only up to three questions is permitted a player in any given consecutive twenty four hours or in any given calendar day. Accordingly, in some examples, the trial count is an integer count, and tolling is defined by increasing the trial count by one with each tolling.

The method 700 proceeds to step 716, to determine whether the trial count has reached a predetermined condition. In some examples, the trial count reaches a predetermined condition by reaching a threshold integer number upon a tolling at step 714. Upon the trial count reaching a predetermined condition (YES), the session of multiple trials is terminated in step 718. If the trial count as step 718 has not reached the predetermined condition (NO), the method proceeds to a next trial by returning to step 704.

Thus, until the trial count reaches the predetermined condition, the method loops though the return branch 720.

In some embodiments of the described method and system, wherein, upon terminating the session of multiple trials, the computing system further prevents any other session of multiple trials for the player device for at least one of a delay interval and a change of date. Thus, the player device, and essentially the associated user, are blocked from another session for any predetermined period of time (delay interval), or, for example, the next calendar day. Other blockage periods can be defined.

In some examples, the computing system stores account information for multiple registered users, the account information for each particular registered user including user identification, user contact information by which at least one player device is associated with the particular registered user, and a token count. For example, the first entity may operate as a financial institution and accordingly maintain financial accounts for users and offer banking related products and services. In such an example, the subject matters of the query prompts and/or associated questions can guide education about financial matters and the products and services of the first entity or its affiliates. Subjects can include, as non-limiting examples, financial and accounting basics, insurance, mortgages, investing, crypto currency, retirement investing, and others.

The trial-unique query prompts, and the questions included or associated therewith, represent the subject matters perused, and thus may be based at least in part on the player rating to match each session of multiple trials to player interest and/or skill level. When the player device is a user device associated with a particular registered user, the player rating can based on the account information of the particular registered user. The account information can include the financial history, spending patterns, life stage according to factors like age, and credit rating of the registered user.

When the player device is a user device associated with a particular registered user, the player rating is based on sending questions to the player device prior to conducting a session of multiple trials and storing replies thereto from the player device, thus acquiring an assessment of the situation, and possibly knowledge, of the player, again to match each session of multiple trials to player interest and/or skill level. In some examples, further information, such as credit rating and accounts information, about an unregistered user is sought from at least one third party source, for example as described above with reference to the external systems 202 and 204 of FIG. 1A.

The first entity in some examples can be described as an enterprise entity, a business entity, a retailer, a merchant entity, a financial institution, a bank, or other service and/or product provider. The first entity can access client data held, acquired, and/or stored for example as described above with reference to the storage device 224 of FIG. 1A and data 234 stored therein. The service entity, in some examples, can also utilize available other party data that can be purchased and/or otherwise acquired, for example as described above with reference to the external systems 202 and 204 of FIG. 1A.

Some embodiments, for example implemented as a system and/or associated method, are provided for generating a gaming graphical user interface and conducting query and reply trials at least in part by use of an artificial intelligence (AI) algorithm. In such cases, the query prompts as used in the above descriptions are procured, using an AI algorithm trained by a machine learning technique. That is, a trial-unique query prompt based at least in part on the player rating can be procured by automatically generating the query prompt, and/or by selecting the query prompt, each by use of AI algorithm trained by a machine learning technique.

Using the trained AI algorithm, a trial-unique query prompt can be generated based at least in part on the account information of the particular registered user. The AI algorithm can access further information, such as credit rating and accounts information, about an unregistered user from at least one third party source, for example as described above with reference to the external systems 202 and 204 of FIG. 1A. These features are beneficial to match each session of multiple trials to player interest and/or skill level.

Using the trained AI algorithm, a trial-unique query prompt can be selected from a cache, for example based at least in part on the player rating. The cache may include query prompts previously AI generated and/or collected, for example by virtual agents 214, and query prompts accumulated with assistance by human agents 210.

Selecting the query prompt for any second or subsequent trial in a session may include selecting a query prompt having a raised difficulty rating among at least some of the multiple registered users if an affirmation is confirmed for at least one prior reply signal. By such features, as correct answers are made by reply, the difficulty or sophistication of upcoming questions can be guided by whether prior answers, in that session or another, were correct or incorrect. User interest and engagement can thus be maintained and increased.

Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. A system for generating a gaming graphical user interface and conducting query and reply trials, the system comprising:

a computing system of a first entity including at least one processor configured to execute computer-readable instructions, at least one of a memory device and a non-transitory storage device, and a communication interface for operatively connecting, via a communication network, the at least one processor to a player device to which a player rating is associated;

wherein, upon executing the computer-readable instructions, the at least one processor is configured to operates the computing system to conduct a session of multiple trials, in succession, in each of which the at least one processor is configured to operate the computing system to:

train an AI algorithm using a computer-implemented iterative training loop into which training data is inserted, the training data comprising query prompts stored in a cache;

deploy the AI algorithm and thereby automatically select a trial-unique query prompt based at least in part on the player rating;

send the trial-unique query prompt to the player device;

receive a reply signal from the player device;

compare the reply signal to a stored key to confirm only one of affirmation and refutation;

upon confirming affirmation, increment a token count associated with the player device;

toll a trial count; and upon the trial count reaching a predetermined condition, terminate the session of multiple trials.

2. The system according to claim 1 wherein, upon terminating the session of multiple trials, the computing system prevents any other session of multiple trials for the player device for at least one of a delay interval and a change of date.

3. The system according to claim 1, wherein the trial count reaching a predetermined condition comprises reaching an integer number.

4. The system according to claim 1, wherein the computing system stores account information for multiple registered users, the account information for each particular registered user comprising user identification, user contact information by which at least one user device is associated with the particular registered user, and a token count.

5. The system according to claim 4 wherein, when the player device comprises a user device associated with a particular registered user, the player rating is based on the account information of the particular registered user.

6. The system according to claim 4 wherein, when the player device does not comprise a user device associated with a particular registered user, the player rating is based on at least one of:

sending questions to the player device prior to conducting a session of multiple trials and storing replies thereto from the player device; and
    information from at least one third party source regarding a user with the player device.

7. The system according to claim 1, further comprising permitting a user of the player device access to at least one prize based at least in part on the token count associated with the player device.

8. The system according to claim 1, wherein the trial-unique query prompt of any particular trial comprises instructions to display, on a display screen of the player device, a graphical user interface comprising a particular question and associated multiple selectable answers, wherein one of the selectable answers corresponds to the stored key.

9. The system according to claim 1, wherein automatically selecting a trial-unique query prompt for any second or subsequent trial in a session comprises selecting at least in part according to whether an affirmation is confirmed for at least one prior reply signal.

10. The system according to claim 9, wherein selecting a trial-unique query prompt for any second or subsequent trial in a session comprises selecting a query prompt having a raised difficulty rating if an affirmation is confirmed for at least one prior reply signal.

11. A method for a computing system to generate a gaming graphical user interface and conduct query and reply trials, the a computing system being of a first entity and including at least one processor configured to execute computer-readable instructions, at least one of a memory device and a non-transitory storage device, and a communication interface for operatively connecting, via a communication network, the at least one processor to a player device to which a player rating is associated, the method comprising, upon executing the computer-readable instructions, the at least one processor operating the computing system to:

conduct a session of multiple trials, in succession, in each of which the at least one processor operates the computing system to:

train an AI algorithm using a computer-implemented iterative training loop into which training data is inserted, the training data comprising query prompts stored in a cache;
    deploy the AI algorithm and thereby automatically select a trial-unique query prompt based at least in part on the player rating;
    send the trial-unique query prompt to the player device;
    receive a reply signal from the player device;
    compare the reply signal to a stored key to confirm only one of affirmation and refutation;
    upon confirming affirmation, incrementing a token count associated with the player device;
    toll a trial count; and
    upon the trial count reaching a predetermined condition, terminating the session of multiple trials.

12. The method according to claim 11 wherein, upon terminating the session of multiple trials, the computing system prevents any other session of multiple trials for the player device for at least one of a delay interval and a change of date.

13. The method according to claim 12, wherein the trial count reaching a predetermined condition comprises reaching an integer number.

14. The method according to claim 11, wherein the computing system stores account information for multiple registered users, the account information for each particular registered user comprising user identification, user contact information by which at least one user device is associated with the particular registered user, and a token count.

15. The method according to claim 14 wherein, when the player device comprises a user device associated with a particular registered user, the player rating is based on the account information of the particular registered user.

16. The method according to claim 14 wherein, when the player device does not comprise a user device associated with a particular registered user, the player rating is based on at least one of:

sending questions to the player device prior to conducting a session of multiple trials and storing replies thereto from the player device; and
    information from at least one third party source regarding a user with the player device.

17. The method according to claim 11, further comprising permitting a user of the player device access to at least one prize based at least in part on the token count associated with the player device.

18. The method according to claim 11, wherein the trial-unique query prompt of any particular trial comprises instructions to display, on a display screen of the player device, a graphical user interface comprising a particular question and associated multiple selectable answers, wherein one of the selectable answers corresponds to the stored key.

19. The method according to claim 11, wherein automatically selecting a trial-unique query prompt for any second or subsequent trial in a session comprises selecting at least in part according to whether an affirmation is confirmed for at least one prior reply signal.

20. The method according to claim 19, wherein selecting a trial-unique query prompt for any second or subsequent trial in a session comprises selecting a query prompt having a raised difficulty rating if an affirmation is confirmed for at least one prior reply signal.

* * * * *